US012700356B2

(12) United States Patent
Kim et al.

(10) Patent No.: US 12,700,356 B2
(45) Date of Patent: Aug. 4, 2026

(54) SENSING TIME FOR IMAGE RETENTION COMPENSATION IN OLED DISPLAYS

(71) Applicant: DELL PRODUCTS L.P., Round Rock, TX (US)

(72) Inventors: Daehyun Kim, Singapore (SG); Kyoungjun Kim, Singapore (SG); Seungjoo Choi, Singapore (SG)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 18/676,767

(22) Filed: May 29, 2024

(65) Prior Publication Data

US 2025/0372030 A1 Dec. 4, 2025

(51) Int. Cl.
*G09G 3/3208* (2016.01)

(52) U.S. Cl.
CPC ....... *G09G 3/3208* (2013.01); *G09G 2310/02* (2013.01); *G09G 2320/0257* (2013.01); *G09G 2354/00* (2013.01)

(58) Field of Classification Search
None
See application file for complete search history.

(56) References Cited

U.S. PATENT DOCUMENTS 7,551,164 B2 * 6/2009 Deane .................. G09G 3/3233 345/82
7,609,238 B2 * 10/2009 Chang .................. G09G 3/3216 345/82
8,497,827 B2 * 7/2013 Lee ...................... G09G 3/3233 345/82
9,269,302 B2 * 2/2016 Gu ....................... G09G 3/3233
9,947,271 B2 * 4/2018 Wang ..................... G09G 3/325
10,361,262 B2 * 7/2019 Cai ...................... G09G 3/3266
11,244,616 B2 2/2022 Guo et al.
11,295,674 B2 * 4/2022 Yang .................... G09G 3/3258
11,302,269 B2 * 4/2022 Kim ..................... H10K 59/121
11,810,531 B1 * 11/2023 Yi ............................ G09G 5/10
2016/0012773 A1 * 1/2016 Lee ...................... G09G 3/2007 345/78
2018/0088885 A1 * 3/2018 Deng ................... G09G 3/3208
2018/0286356 A1 * 10/2018 Jiang ........................ G09G 5/02
2023/0097372 A1 3/2023 Tian et al.
2024/0296795 A1 * 9/2024 Suzuki ................. G09G 3/3233
2025/0273112 A1 * 8/2025 Kim ..................... G09G 3/2096
2025/0330563 A1 * 10/2025 Liou .................... H04N 13/398

* cited by examiner

*Primary Examiner* — Fred Tzeng

(74) *Attorney, Agent, or Firm* — Larson Newman, LLP

(57) ABSTRACT

An OLED display device includes an OLED panel having a plurality of rows of pixels and a display logic module. The display logic module scans a first threshold voltage for each pixel in a first row of the pixels, skips a scan of a second threshold voltage for each pixel in a second number (m) of rows of pixels, and scans a third threshold voltage for each pixel in a third row (row m+1) of pixels. For each pixel in the second number (m) of rows, the display logic module interpolates a threshold voltage value between the first threshold voltage of an associated pixel in the first row and the third threshold voltage of an associated pixel in the third row. Here, m is greater than zero (0).

20 Claims, 6 Drawing Sheets

SENSING TIME FOR IMAGE RETENTION COMPENSATION IN OLED DISPLAYS

FIELD OF THE DISCLOSURE

This disclosure generally relates to information handling systems, and more particularly relates to an improved sensing time for image compensation in an OLED display in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An organic light-emitting diode (OLED) display device may include an OLED panel having a plurality of rows of pixels and a display logic module. The display logic module may scan a first threshold voltage for each pixel in a first row of the pixels, skip a scan of a second threshold voltage for each pixel in a second number (m) of rows of pixels, and scan a third threshold voltage for each pixel in a third row (row m+1) of pixels. For each pixel in the second number (m) of rows, the display logic module may interpolate a threshold voltage value between the first threshold voltage of an associated pixel in the first row and the third threshold voltage of an associated pixel in the third row. Here, m may be greater than zero (0).

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
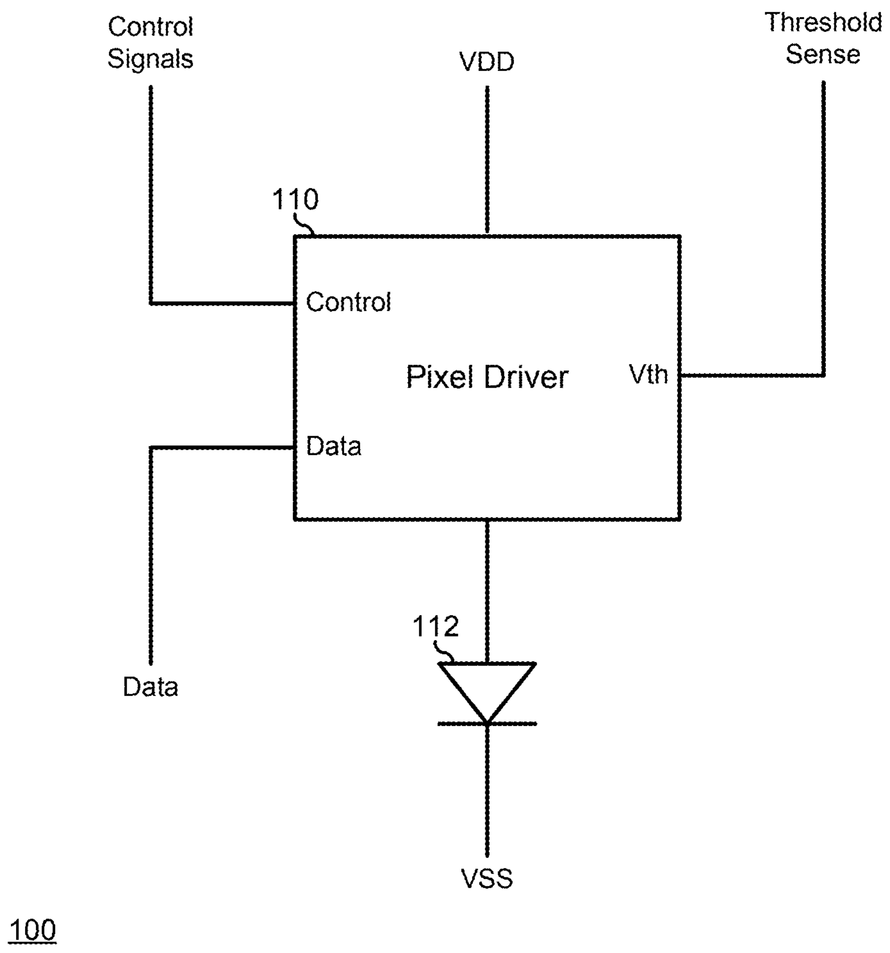
FIG. 1 is a block diagram illustrating an OLED pixel sub-element according to an embodiment of the present disclosure.

FIG. 1 illustrates an organic light-emitting diode (OLED) picture element (pixel) sub-element 100. A pixel represents a smallest unit of an image display device, which, when viewed in combination with the other pixels of the image display device, forms the image. A pixel typically includes three (3) pixel sub-elements such as sub-element 100. For example, a typical pixel may include a red pixel sub-element, a blue pixel sub-element, and a green pixel sub-element. For the purposes of the current disclosure, each pixel sub-element of a pixel may be understood to represent a commonly configured pixel sub-element, and the functions and features as described with regard to pixel sub-element 100 will be understood to be commonly ascribed to the other pixel sub-elements of the associated pixel. In this regard, a pixel sub-element may be referred to simply as a pixel without necessarily referring to each pixel sub-element separately. The design, fabrication, and operation of pixels such as pixel 100 are understood in the art and will not be further described herein, except as may be needed to illustrate the current embodiments.

Pixel 100 includes a pixel driver circuit 110 and an OLED device 112. Pixel driver circuit 110 operates to receive a data signal that is associated with a brightness level to be attained in energizing OLED device 112, and to ascribe the brightness level based upon various control signals provided to the pixel driver circuit. An anode of OLED device 112 is connected to a ground plane (VSS), and a cathode of the OLED device is connected to an output of pixel driver circuit 110. Pixel driver circuit 110 then operates to connect OLED device 112 to voltage plane (VDD) in a controlled way to achieve the desired brightness level. The details of pixel driver circuits such as pixel driver circuit 110, and the control of brightness levels of their associated OLED devices are known in the art and will not be further described herein, except as may be needed to illustrate the current embodiments.

OLED image display devices, and particularly OLED display devices that utilize a quantum dot OLED (QD OLED) display technology or a white OLED (WOLED) display technology, are known to exhibit an image retention phenomenon where a previously displayed image appears as a shadow on subsequently displayed images. Such image retention occurs when the previously displayed image is displayed for a long duration of time. For example, where a display device commonly displays a static screen saver, a user home page, or the like, subsequently displayed images may retain a shadow of the screen saver or user home page. A common cause of such image retention is a change of a particular voltage threshold (Vth) in the pixel driver circuits of the display device. Such image retention may typically be compensated by measuring the particular voltage threshold on each pixel of the image display device and applying an appropriate compensating input to the pixel driver circuit to counteract the change in the voltage threshold. The measurement of the voltage threshold is typically performed by measuring the voltage on a particular timing input signal (typically a Vint signal) of the pixel driver circuit. This measurement is thus performed at a predetermined time when data is not being provided to the pixel driver circuit. The details of voltage threshold measurement and compensation are known in the art and will not be further described herein, except as may be needed to illustrate the current embodiments.

Figure 2:
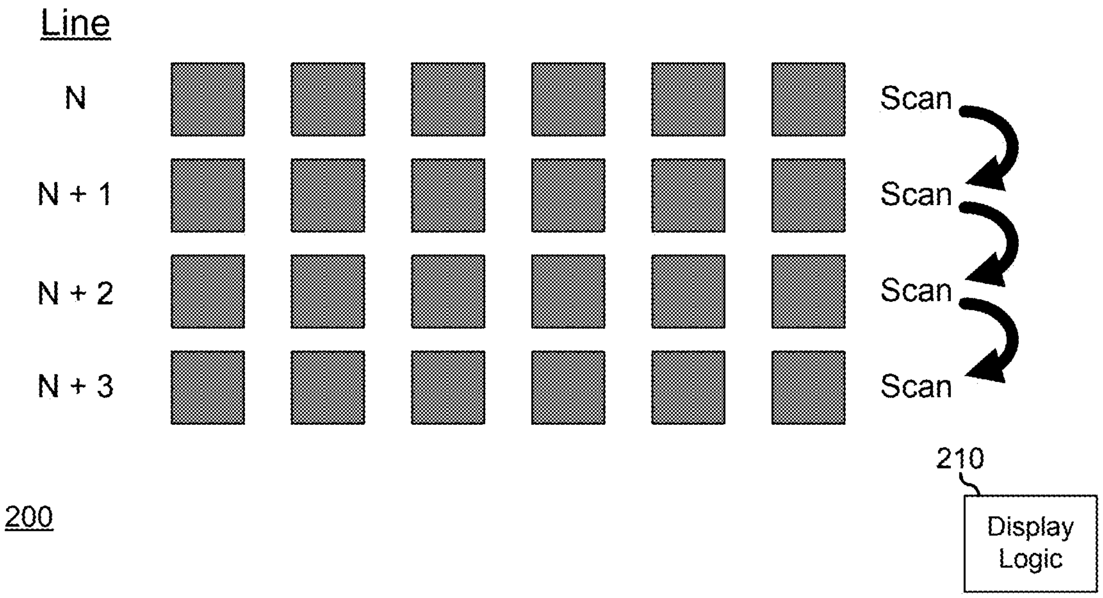
FIG. 2 (Prior Art)
FIG. 2 illustrates an image retention compensation process for an OLED image display device as may be known in the art.

FIG. 2 illustrates an image retention compensation process for an OLED image display device 200, as may be known in the art. Here, four (4) image lines of OLED image display device 200 are illustrated for simplicity. In this image retention compensation process, display logic 210 of the associated display device operates to scan the threshold voltages (Vth) of each pixel in a first row (N), to scan the threshold voltages (Vth) of each pixel in a next row (N+1), to scan the threshold voltages (Vth) of each pixel in a next row (N+2), and to scan the threshold voltages (Vth) of each pixel in a next row (N+3). Here, the threshold voltages (Vth) of each pixel in each row of pixels of OLED image display device 200 will likewise be sequentially scanned until all pixels of the OLED image display device are scanned. Subsequent to the scanning of the threshold voltage (Vth) of each pixel, display logic 210 operates to apply the appropriate compensation to each pixel based upon the scanned threshold voltage (Vth). It will be understood that the application of the compensation may be provided in any order as needed or desired. For example, the compensation for each pixel may be applied before the next pixel is scanned, the compensation for each row of pixels may be applied after each row is scanned, but before the scanning of the next row, or all pixels may be scanned for the entire OLED image display device 200 or a sizable portion thereof, and then the compensation can be applied to the entire OLED image display device or portion thereof, as needed or desired.

This image retention compensation process may be understood to be scheduled periodically on OLED image display device 200. For example, OLED image display device 200 may schedule the image retention compensation process at predetermined intervals during a day of operation of the OLED image display device. In this regard, a typical OLED image display device may schedule the image retention compensation once every four (4) hours of operation, but such scheduling may be overridden by a user. For example, OLED image display device 200 may display a prompt to a user to perform the process. Here, if no user response is received, or if a user response affirms the scheduled process, OLED display device 200 performs the image retention compensation process. On the other hand, if the user response indicates an unwillingness to have the image retention compensation process at that time, OLED display device 200 reschedules the process for a later time (e.g., four (4) hours later). However, the image retention phenomenon may become permanent without periodically running the image retention compensation process. As such, OLED display device 200 operates to enforce a second scheduling threshold, at which time the image retention process is forced, regardless of a user's intent. For example, OLED display device 200 may operate to perform an image retention process once every 20 hours, once every 24 hours, or another duration, regardless of a user's input to postpone the image retention compensation process.

The inventors of the current embodiments have understood that the execution of the image retention process typically takes a long duration of time to complete. For example, the image retention process for a typical OLED display device may take six (6) to ten (10) minutes, depending upon the size of the OLED display device. The inventors have further understood that the forced implementation of an image retention compensation process represents an unwanted and underappreciated imposition upon the user experience. Consider, for example, a situation where a user is engaged with the OLED display device and the scheduled forced execution of the image retention compensation process occurs. Here, the user is forced to wait for the entire duration of the process (i.e., 6-10 minutes) before they can utilize the OLED display device.

Figure 3:
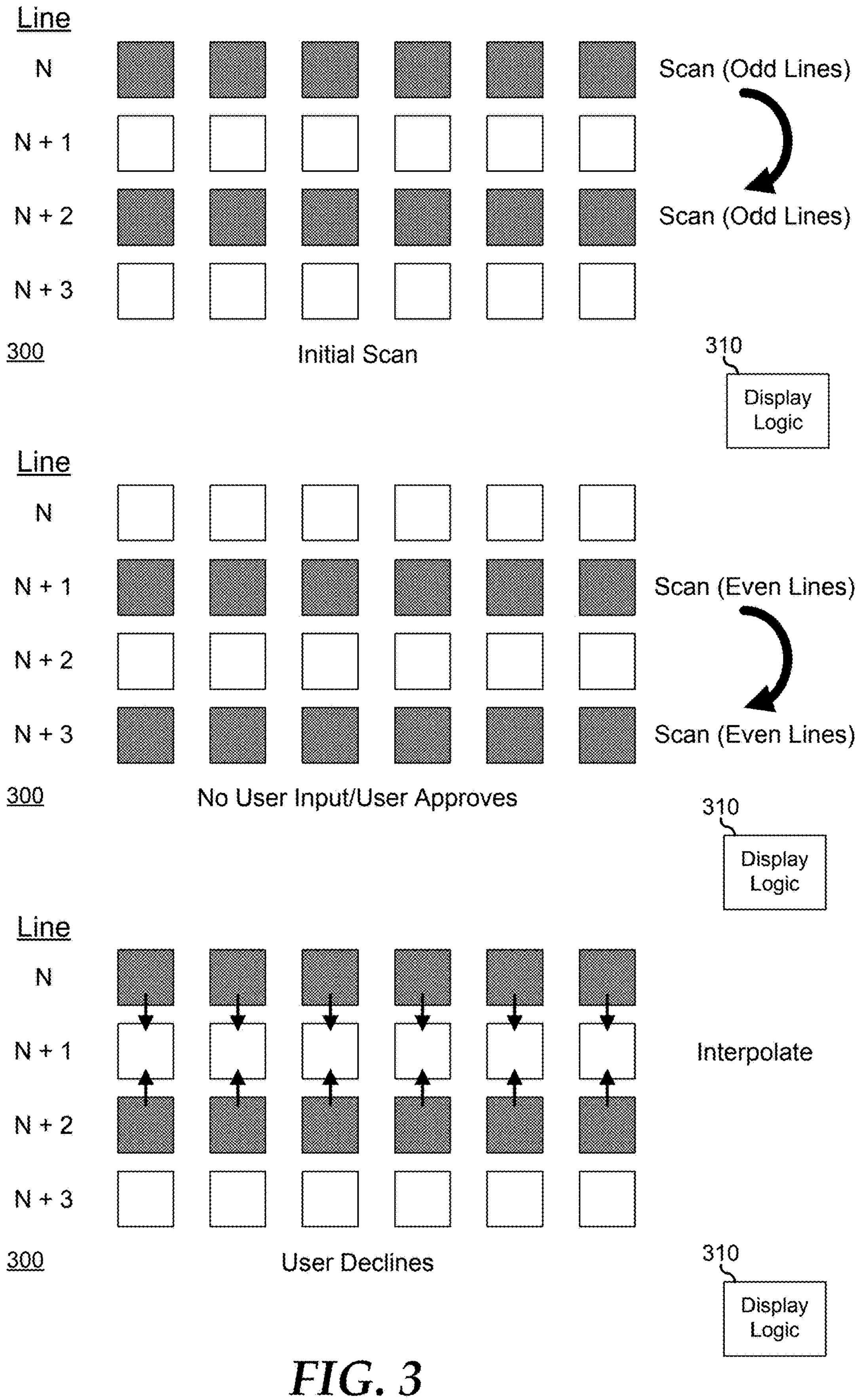
FIG. 3 illustrates an image retention compensation process for an OLED image display device according to an embodiment of the present disclosure.

FIG. 3 illustrates an image retention compensation process for an OLED image display device 300 according to a particular embodiment. Here, four (4) image lines of OLED image display device 300 are illustrated for simplicity. In an initial scan process of this image retention compensation process, display logic 310 of the associated display device operates to scan the threshold voltages (Vth) of each pixel in each odd-numbered row (e.g., row (N) and row (N+2)), while skipping the scan of the threshold voltages in each even-numbered row (e.g., row (N+1) and row (N+3)). Here, the threshold voltages (Vth) of each pixel in each odd-numbered row of pixels of OLED image display device 300 will likewise be sequentially scanned until all pixels of all odd-numbered rows of the OLED image display device are scanned.

After the odd-numbered rows are all scanned, display logic 310 operates to prompt a user of OLED image display device 300 as to whether or not to continue the image retention compensation process. If control logic 310 receives no user input, or if the user approves the continuation of the image retention compensation process, a subsequent scan process of the image retention compensation process proceeds where display logic 310 operates to scan the threshold voltages (Vth) of each pixel in each even-numbered row (e.g., row (N+1) and row (N+3)), while skipping the scan of the threshold voltages in each odd-numbered row (e.g., row (N) and row (N+2)). Here, the threshold voltages (Vth) of each pixel in each even-numbered row of pixels of OLED image display device 300 will likewise be sequentially scanned until all pixels of all even-numbered rows of the OLED image display device are scanned, and hence all rows of the OLED image display device are scanned. At this point, display logic 310 operates to apply the appropriate compensation to each pixel based upon the scanned threshold voltage (Vth).

However, when control logic 310 receives a user input declining to allow the image retention compensation process, the display logic operates to calculate an interpolated threshold voltage (Vth) for the even-numbered rows (e.g., row (N+1) and row (N+3)) where the interpolated threshold voltage (Vth) is the average value of the sum of the threshold values of the next lower odd-numbered row and the next higher odd-numbered row. For example, each pixel in row (N+1) will be ascribed a threshold voltage value of:

$$(Vth\,(\text{row } N) + Vth\,(\text{row } N+2))/2. \quad \text{Equation 1}$$

In either case, after the threshold voltage values of all pixels in all rows are determined, the application of the compensation may be provided in any order as needed or desired. For example, the compensation for each pixel may be applied before the next pixel is scanned, the compensation for each row of pixels may be applied after each row is scanned, but before the scanning of the next row, or all pixels may be scanned for the entire OLED image display device 300 or a sizable portion thereof, and then the compensation can be applied to the entire OLED image display device or portion thereof, as needed or desired. In this way, a user may decline a full scan process, and thereby cut the time associated with the image retention compensation process in half.

Figure 4:
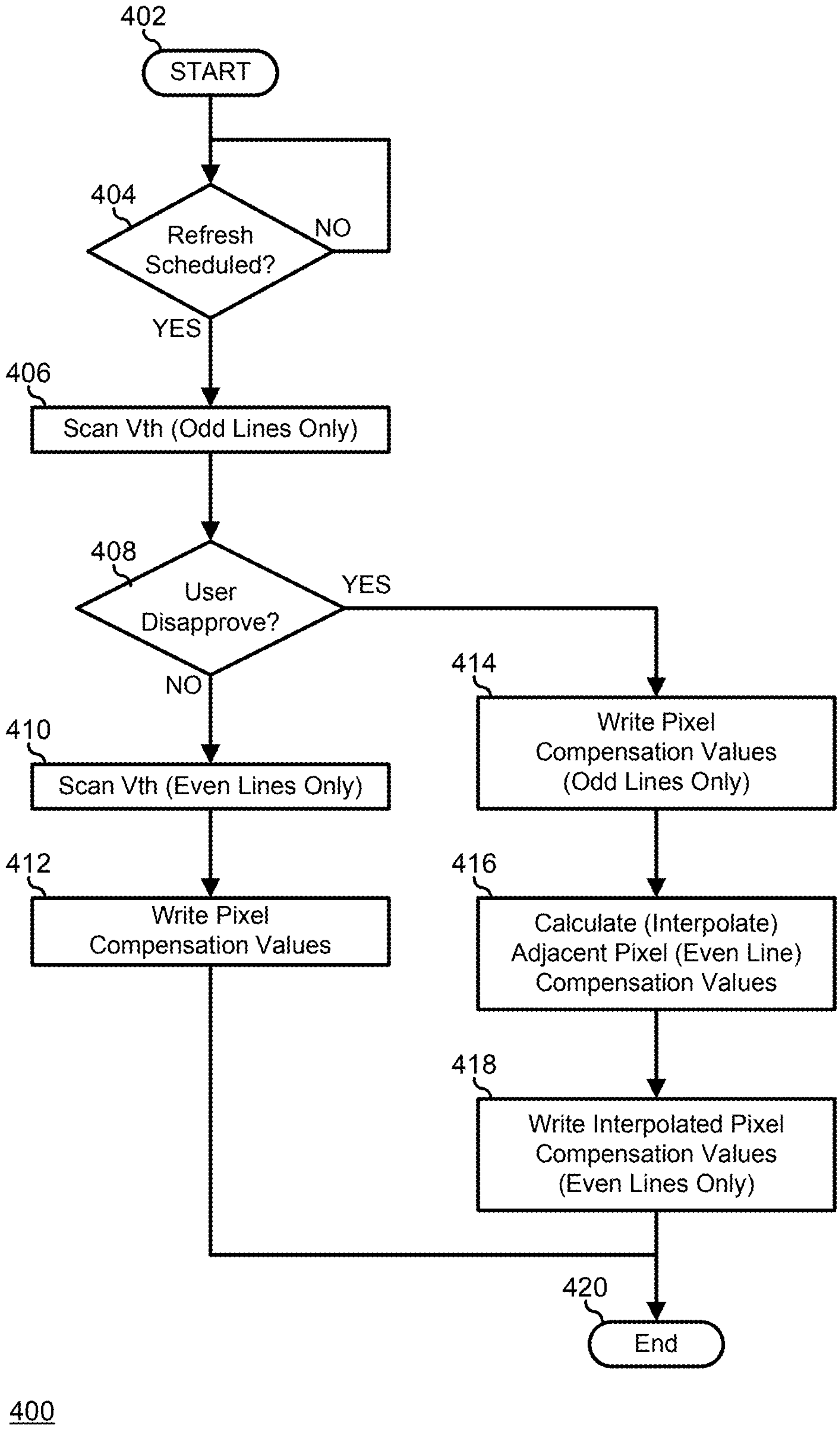
FIG. 4 is a flowchart illustrating a method for providing an improved sensing time for image retention compensation in an OLED display device according to an embodiment of the present disclosure.

FIG. 4 illustrates a method 400 for providing an improved sensing time for image retention compensation in an OLED display device, starting at block 402. A decision is made as to whether or not an image retention compensation process for an OLED display device (described here as a display panel refresh) is scheduled in decision block 404. For example, a display panel refresh may be scheduled after an accumulation of four (4) hours of operation of the OLED display device. If not, the “NO” branch of decision block 404 is taken, and the method loops to decision block 404 until the display panel refresh is scheduled. When the display panel refresh is scheduled, the “YES” branch of decision block 404 is taken and a scan operation is commenced on the odd-numbered lines of the OLED display device in block 406. A decision is made as to whether or not a user prompt to approve or disapprove a full image retention compensation process was disapproved by the user in decision block 408. If not, that is, if the user did not disapprove the full image retention compensation process, or if no response was given to the user prompt, the “NO” branch of decision block 408 is taken, a scan operation is commenced on the even-numbered lines of the OLED display device in block 410, each pixel of the OLED display device is written with the associated threshold voltage (Vth) in block 412, and the method ends in block 420.

If the user disapproved the full image retention compensation process, the “YES” branch of decision block 408 is taken and each pixel of the odd-numbered lines are written with the associated threshold voltages (Vth) in block 414. The threshold voltage (Vth) compensation values for the even-numbered lines of the OLED display device are calculated by interpolating between the values of the pixel of the closest lower numbered odd-numbered line and the pixel of the closest higher numbered odd-numbered line, as shown in Equation 1 above, in block 416. The threshold voltage (Vth) compensation values for the even-numbered lines are written to the pixels of the even-numbered lines in block 418, and the method ends in block 420.

Note that method 400 as shown and described is provided as an example embodiment, and other embodiments may be provided where certain method steps are performed in different orders. For example, the decision in response to the user prompt, as shown in decision block 408, may occur before any lines are scanned, as commenced in block 406, as needed or desired. In another example, the calculation of the threshold voltage (Vth) compensation values, as shown in block 416, may occur before any compensation values are written, as commenced in block 414, as needed or desired.

Figure 5:
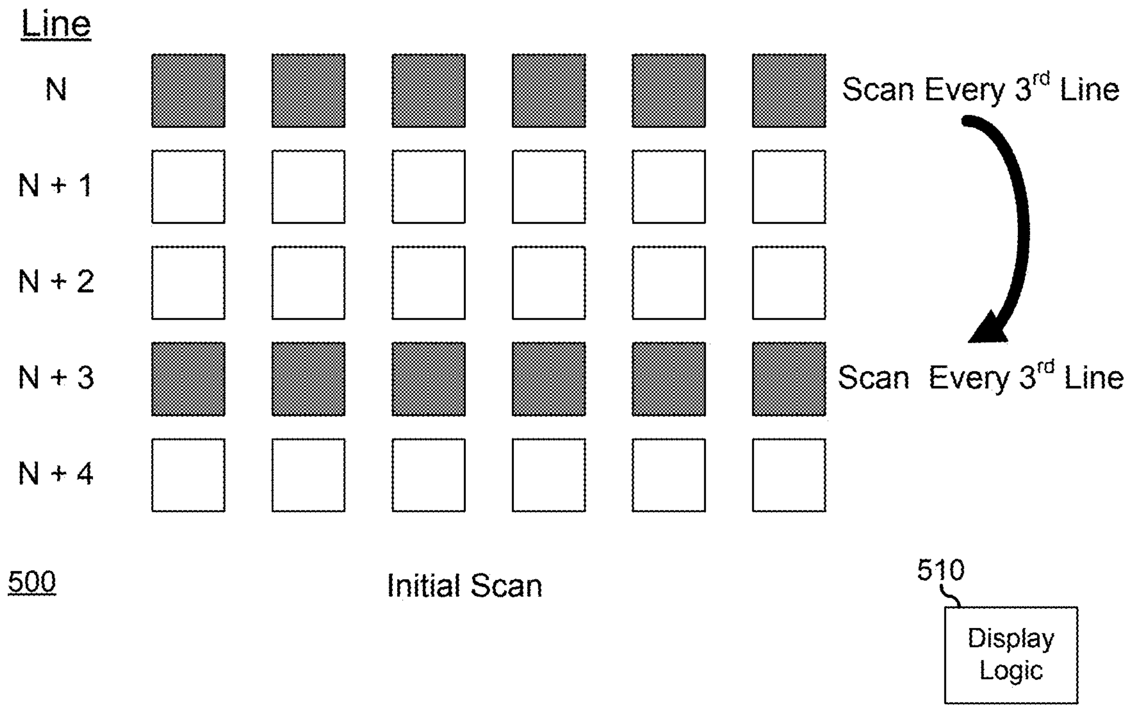
FIG. 5 illustrates an image retention compensation process for an OLED image display device according to another embodiment of the present disclosure.
Figure 5:
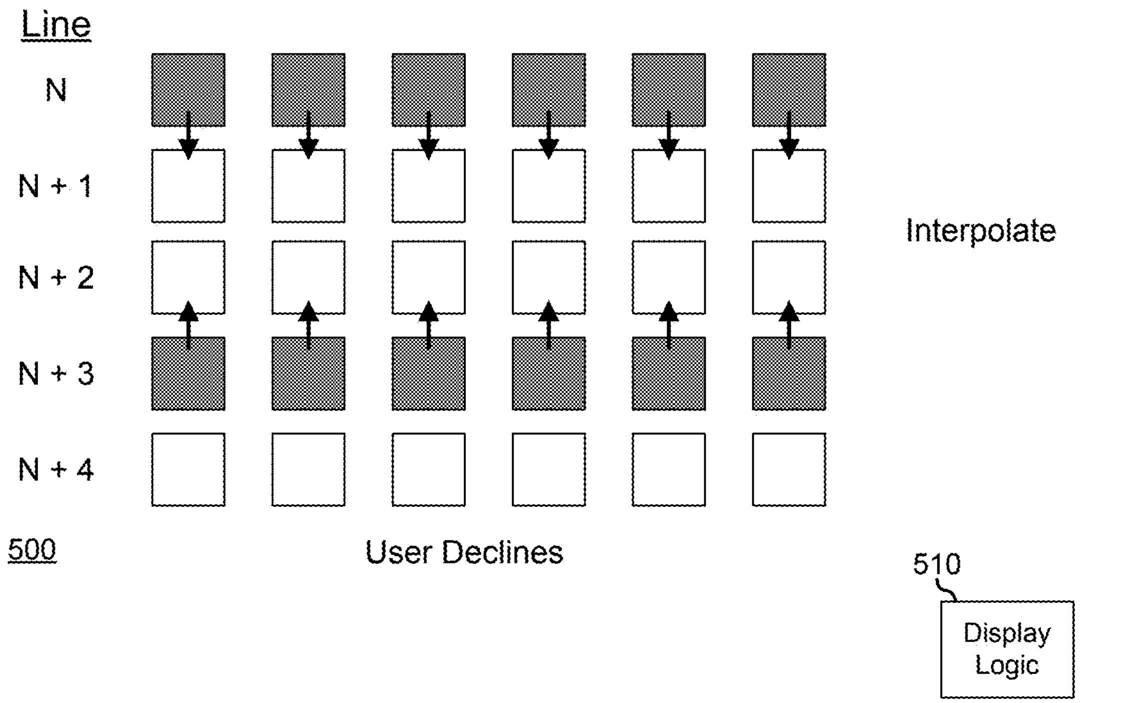

FIG. 5 illustrates an image retention compensation process for an OLED image display device 500 according to another embodiment. Here, five (5) image lines of OLED image display device 500 are illustrated for simplicity. In an initial scan process of this image retention compensation process, display logic 510 of the associated display device operates to scan the threshold voltages (Vth) of each pixel in each third-numbered row (e.g., row (N) and row (N+3)), while skipping the scan of the threshold voltages in each intervening-numbered row (e.g., row (N+1) and row (N+2)). Here, the threshold voltages (Vth) of each pixel in each third-numbered row of pixels of OLED image display device 500 will likewise be sequentially scanned until all pixels of all third-numbered rows of the OLED image display device are scanned.

After the third-numbered rows are all scanned, display logic 510 operates to prompt a user of OLED image display device 500 as to whether or not to continue the image retention compensation process. If control logic 510 receives no user input, or if the user approves the continuation of the image retention compensation process, a subsequent scan process of the image retention compensation process (not illustrated) proceeds where display logic 510 operates to scan the threshold voltages (Vth) of each pixel in each intervening-numbered row (e.g., row (N+1) and row (N+2)), while skipping the scan of the threshold voltages in each third-numbered row (e.g., row (N) and row (N+3)). Here, the threshold voltages (Vth) of each pixel in each intervening-numbered row of pixels of OLED image display device 500 will likewise be sequentially scanned until all pixels of all intervening-numbered rows of the OLED image display device are scanned, and hence all rows of the OLED image display device are scanned. At this point, display logic 510 operates to apply the appropriate compensation to each pixel based upon the scanned threshold voltage (Vth).

However, when control logic 510 receives a user input declining to allow the image retention compensation process, the display logic operates to calculate an interpolated threshold voltage (Vth) for the intervening-numbered rows (e.g., row (N+1) and row (N+2)) where the interpolated threshold voltage (Vth) is the average value of the sum of the threshold values of the next lower third-numbered row and the next higher third-numbered row. For example, each pixel in a first intervening row (N+1) will be ascribed a threshold voltage value of:

$$(Vth\,(\text{row } N) + Vth\,(\text{row } N+3))/3; \quad \text{Equation 2}$$

and each pixel in a second intervening row (N+2) will be ascribed a threshold voltage value of:

$$2*(Vth\,(\text{row } N) + Vth\,(\text{row } N+3))/3. \quad \text{Equation 3}$$

In either case, after the threshold voltage values of all pixels in all rows are determined, the application of the compensation may be provided in any order as needed or desired.

For example, the compensation for each pixel may be applied before the next pixel is scanned, the compensation for each row of pixels may be applied after each row is scanned, but before the scanning of the next row, or all pixels may be scanned for the entire OLED image display device 500 or a sizable portion thereof, and then the compensation can be applied to the entire OLED image display device or portion thereof, as needed or desired. In this way, a user may decline a full scan process, and thereby cut the time associated with the image retention compensation process in to on-third the time of the full scan process.

It will be understood that other number of rows to skip during the scan process, and an associated interpolation may be utilized as needed or desired, thereby significantly shortening the duration of the threshold voltage compensation process on an OLED display device. For example, where a full scan of an OLED display device takes six (6) minutes, scanning every other row in a first scan process operates to cut the user-experienced scan time to three (3) minutes, scanning every third row cuts the scan time to two (2) minutes, scanning every fourth row cuts the scan time to one and a half (1.5) minutes, and so on. An optimum number of rows of pixels to skip and yet maintain satisfactory performance may be determined as needed or desired. Further, a method to provide higher number of pixel rows to skip in the initial scan may be devised where the rows scanned in the initial scan are rotated. For example, in the case where every third row is scanned, then, in a first scan, the reduced scan process can start with row N and, in a second scan, the reduced scan process can start with row N+1, and in a third scan, the reduced scan process can start with row N+2. In this way, after three scan processes, all rows will eventually have their threshold voltages (Vth) scanned directly.

Figure 6:
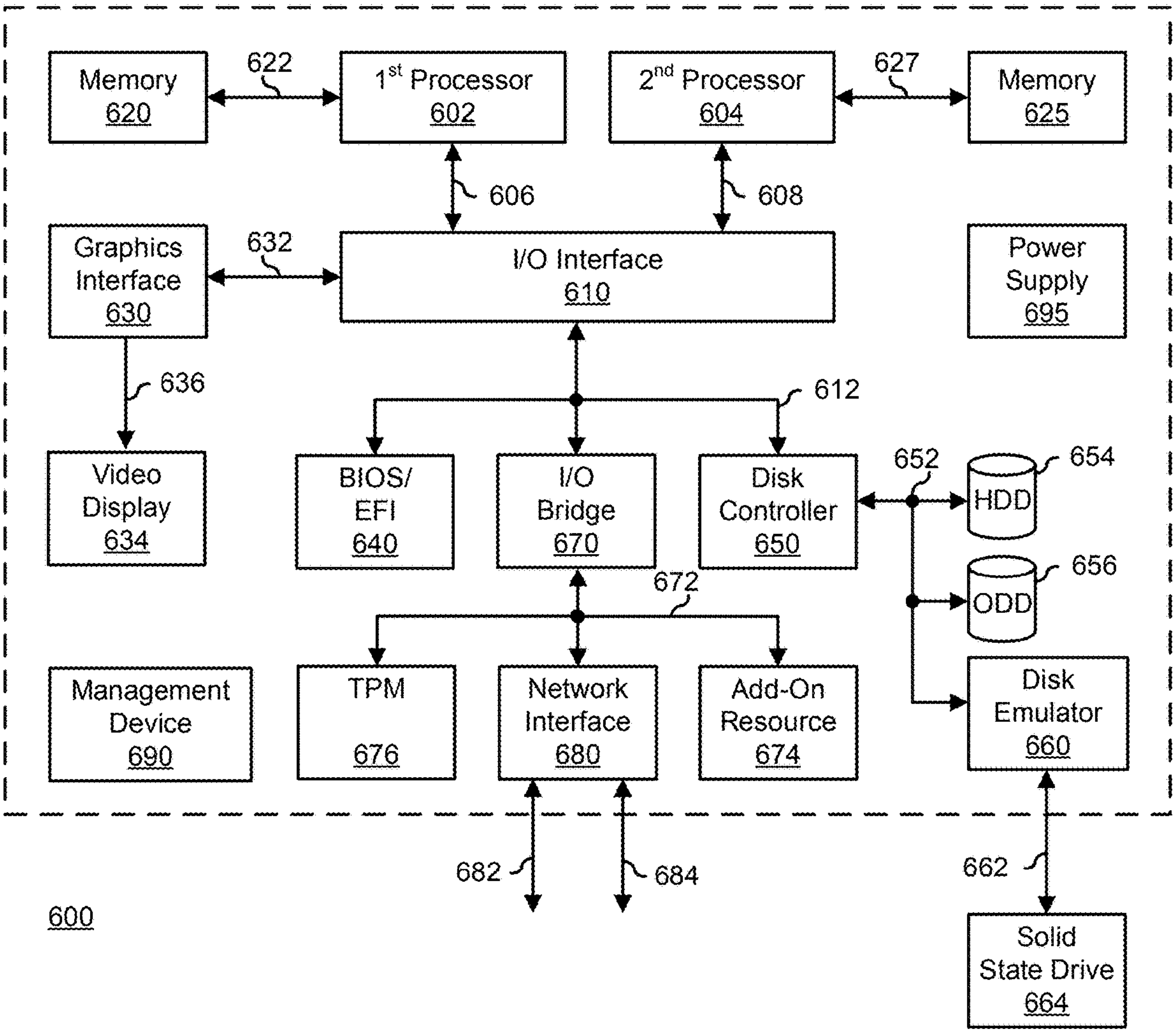
FIG. 6 is a block diagram illustrating a generalized information handling system according to another embodiment of the present disclosure.

FIG. 6 illustrates a generalized embodiment of an information handling system 600 similar to information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 where peripheral interface 672 and the I/O channel are of the same type, and the I/O bridge translates information from a format suitable to the I/O channel to a format suitable to the peripheral channel 672 where they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 where the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An organic light-emitting diode (OLED) display device, comprising:

an OLED panel having a plurality of rows of pixels; and a display logic module configured to scan a first threshold voltage for each pixel in a first row of the pixels, to skip a scan of a second threshold voltage for each pixel in a second number (m) of rows of pixels, to scan a third threshold voltage for each pixel in a third row (row m+1) of pixels, and, for each pixel in the second number (m) of rows, to interpolate a threshold voltage value between the first threshold voltage of an associated pixel in the first row and the third threshold voltage of an associated pixel in the third row, wherein m is greater than zero (0).

2. The OLED display device of claim 1, wherein the display logic module is further configured to apply a first compensation value for each pixel in the first row of pixels and to apply a third compensation value for each pixel in the third row of pixels, wherein each first compensation value is based on the associated first threshold voltage and each third compensation value is based on the associated third threshold voltage.

3. The OLED display device of claim 2, wherein the display logic module is further configured to apply a second compensation value for each pixel in the second number (m) of rows of pixels, wherein each second compensation value is based on the associated interpolated threshold voltage value.

4. The OLED display device of claim 1, wherein the display logic module is further configured to provide a query to a user of the OLED display device, the query to determine whether or not to proceed with a compensation process for the OLED display device.

5. The OLED display device of claim 4, wherein, when the display logic module receives no response to the query or receives a response to proceed with the compensation process, the display logic module is further configured to scan the second threshold voltage for each pixel in the second number (m) of rows of pixels.

6. The OLED display device of claim 5, wherein the display logic module is further configured to apply a first compensation value for each pixel in the first row of pixels, to apply a second compensation value for each pixel in the second number (m) of rows of pixels, and to apply a third compensation value for each pixel in the third row of pixels, wherein each first compensation value is based on the associated first threshold voltage, each second compensation value is based on the associated second threshold voltage, and each third compensation value is based on the associated third threshold voltage.

7. The OLED display device of claim 4, wherein, when the display logic module receives no response to the query or receives a response to proceed with the compensation process, the display logic module is further configured to apply a first compensation value for each pixel in the first row of pixels and to apply a third compensation value for each pixel in the third row of pixels, wherein each first compensation value is based on the associated first threshold voltage and each third compensation value is based on the associated third threshold voltage.

8. The OLED display device of claim 7, wherein the display logic module is further configured to apply a second compensation value for each pixel in the second number (m) of rows of pixels, wherein each second compensation value is based on the associated interpolated threshold voltage value.

9. The OLED display device of claim 1, wherein the second number (m) of rows is equal to one (1) row (m=1).

10. The OLED display device of claim 1, wherein the second number (m) of rows is greater than or equal to two (2) rows (m≥2).

11. A method, comprising:

providing, in an organic light-emitting diode (OLED) display device, an OLED panel having a plurality of rows of pixels;

providing, in the OLED display device, a display logic module;

scanning, by the display logic module, a first threshold voltage for each pixel in a first row of the pixels;

skipping, by the display logic module, a scan of a second threshold voltage for each pixel in a second number (m) of rows of pixels;

scanning, by the display logic module, a third threshold voltage for each pixel in a third row (row m+1) of pixels; and for each pixel in the second number (m) of rows, interpolating, by the display logic module, a threshold voltage value between the first threshold voltage of an associated pixel in the first row and the third threshold voltage of an associated pixel in the third row, wherein m is greater than zero (0).

12. The method of claim 11, further comprising:

applying, by the display logic module, a first compensation value for each pixel in the first row of pixels, wherein each first compensation value is based on the associated first threshold voltage; and applying, by the display logic module, a third compensation value for each pixel in the third row of pixels, wherein each third compensation value is based on the associated third threshold voltage.

13. The method of claim 12, further comprising:

applying, by the display logic module, a second compensation value for each pixel in the second number (m) of rows of pixels, wherein each second compensation value is based on the associated interpolated threshold voltage value.

14. The method of claim 11, further comprising:

providing a query to a user of the OLED display device, the query to determine whether or not to proceed with a compensation process for the OLED display device.

15. The method of claim 14, wherein, when the display logic module receives no response to the query or receives a response to proceed with the compensation process, the method further comprises:

scanning, by the display logic module, the second threshold voltage for each pixel in the second number (m) of rows of pixels.

16. The method of claim 15, further comprising:

applying, by the display logic module, a first compensation value for each pixel in the first row of pixels, wherein each first compensation value is based on the associated first threshold voltage;

applying, by the display logic module, a second compensation value for each pixel in the second number (m) of rows of pixels, wherein each second compensation value is based on the associated second threshold voltage; and applying, by the display logic module, a third compensation value for each pixel in the third row of pixels, wherein each third compensation value is based on the associated third threshold voltage.

17. The method of claim 14, wherein, when the display logic module receives no response to the query or receives a response to proceed with the compensation process, the method further comprises:

applying, by the display logic module, a first compensation value for each pixel in the first row of pixels, wherein each first compensation value is based on the associated first threshold voltage; and applying, by the display logic module, a third compensation value for each pixel in the third row of pixels, wherein each third compensation value is based on the associated third threshold voltage.

18. The method of claim 17, further comprising:

applying, by the display logic module, a second compensation value for each pixel in the second number (m) of rows of pixels, wherein each second compensation value is based on the associated interpolated threshold voltage value.

19. The method of claim 11, wherein the second number (m) of rows is equal to one (1) row (m=1).

20. An organic light-emitting diode (OLED) display device, comprising:

an OLED panel having a plurality of rows of pixels, each pixel including a pixel driver and an OLED device; and a display logic module configured to scan a first threshold voltage for each pixel driver in a first row of the pixels, to skip a scan of a second threshold voltage for each pixel driver in a second number (m) of rows of pixels, to scan a third threshold voltage for each pixel driver in a third row (row m+1) of pixels, and, for each pixel driver in the second number (m) of rows, to interpolate a threshold voltage value between the first threshold voltage of an associated pixel driver in the first row and the second threshold voltage of an associated pixel driver in the third row, wherein m is greater than zero (0).

* * * * *